INVENTOR
Ezra C. Lundahl

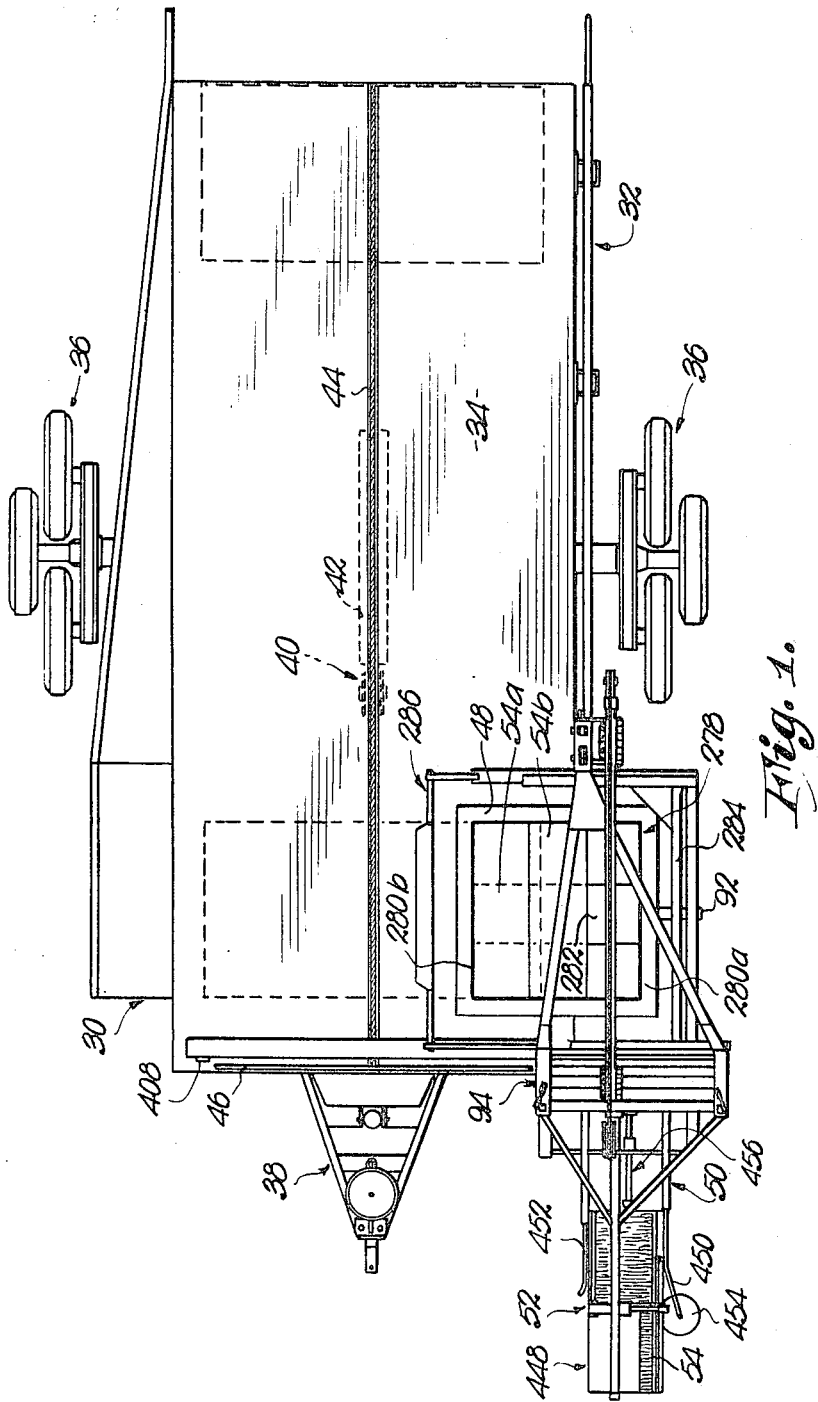

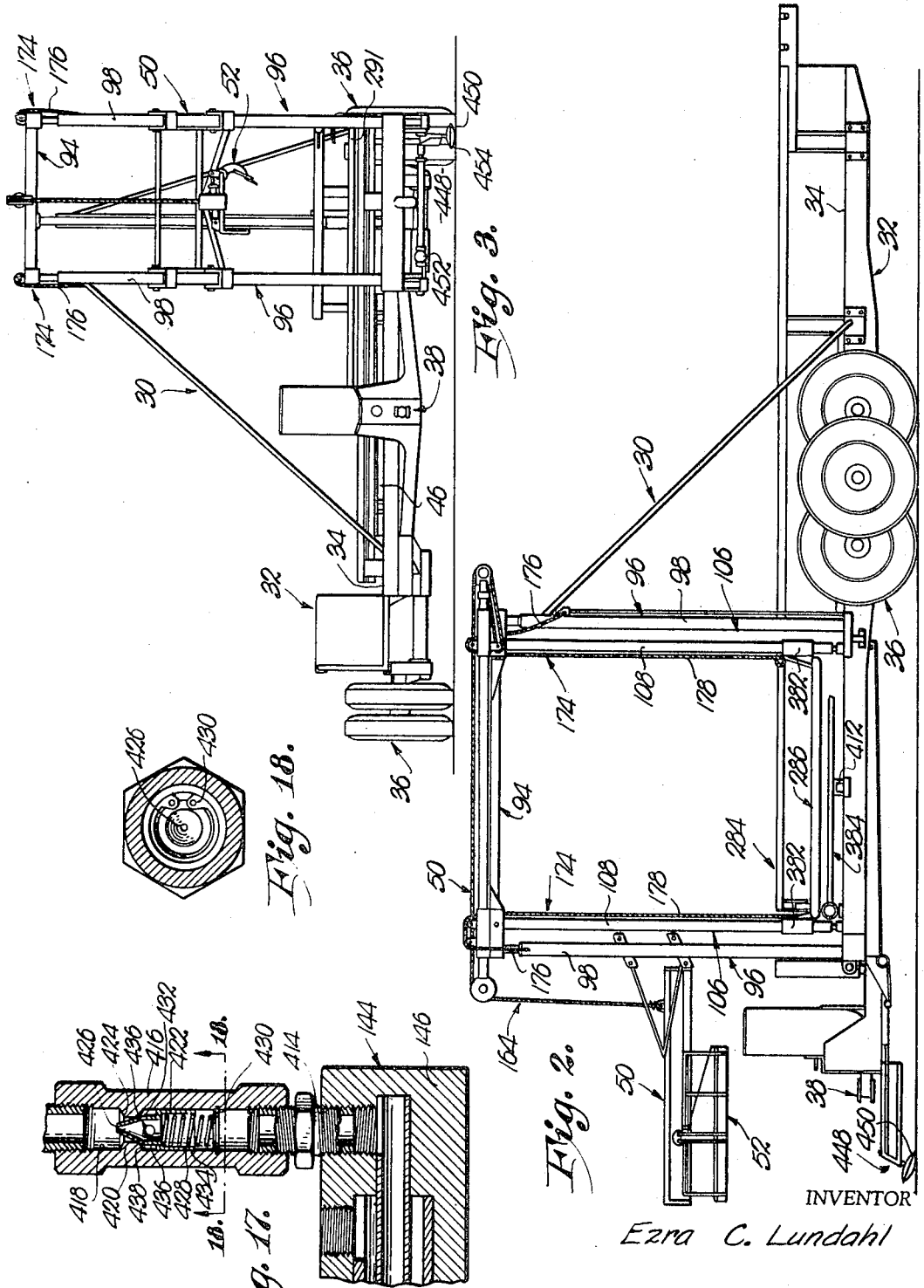

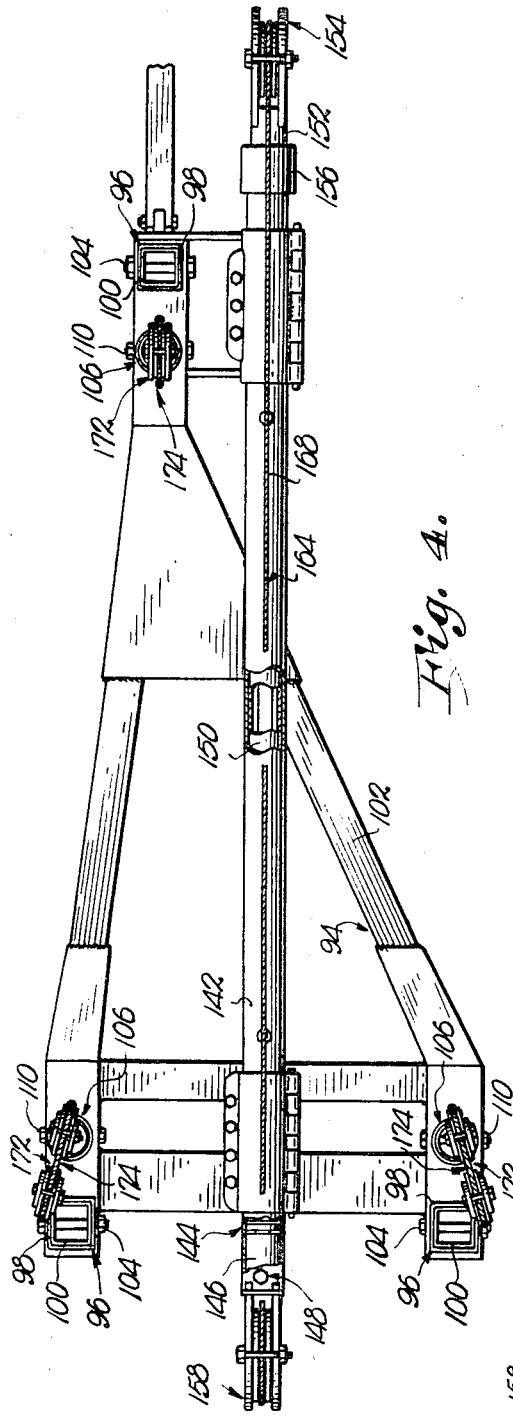
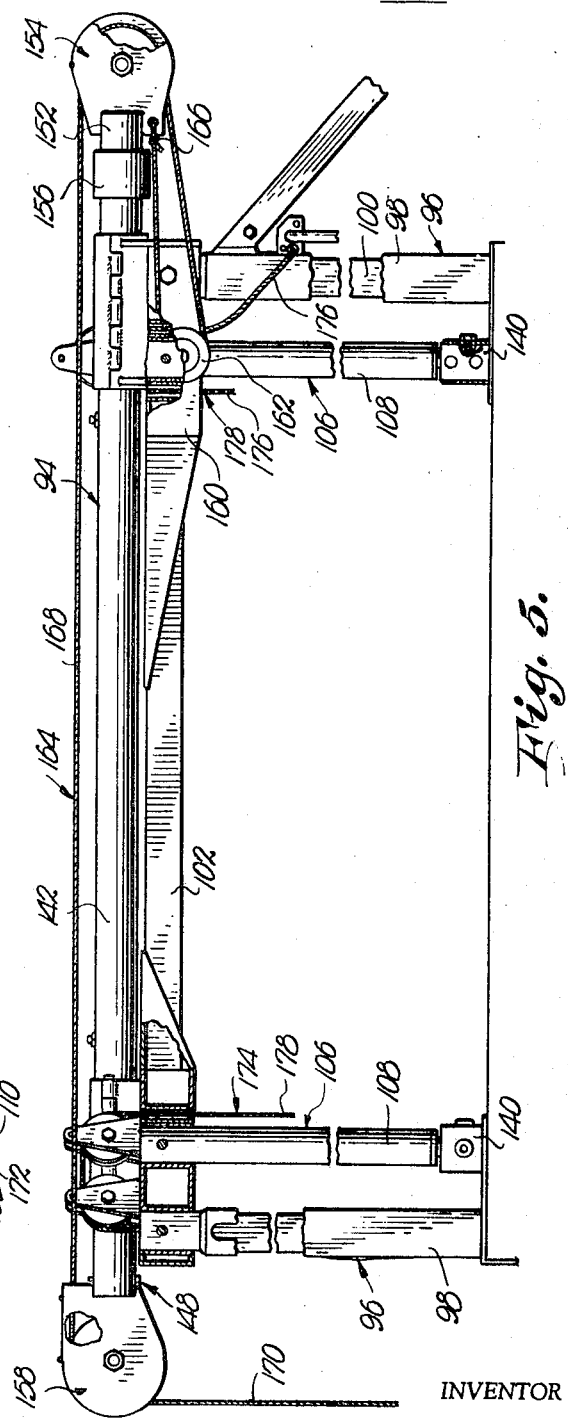
INVENTOR
Ezra C. Lundahl

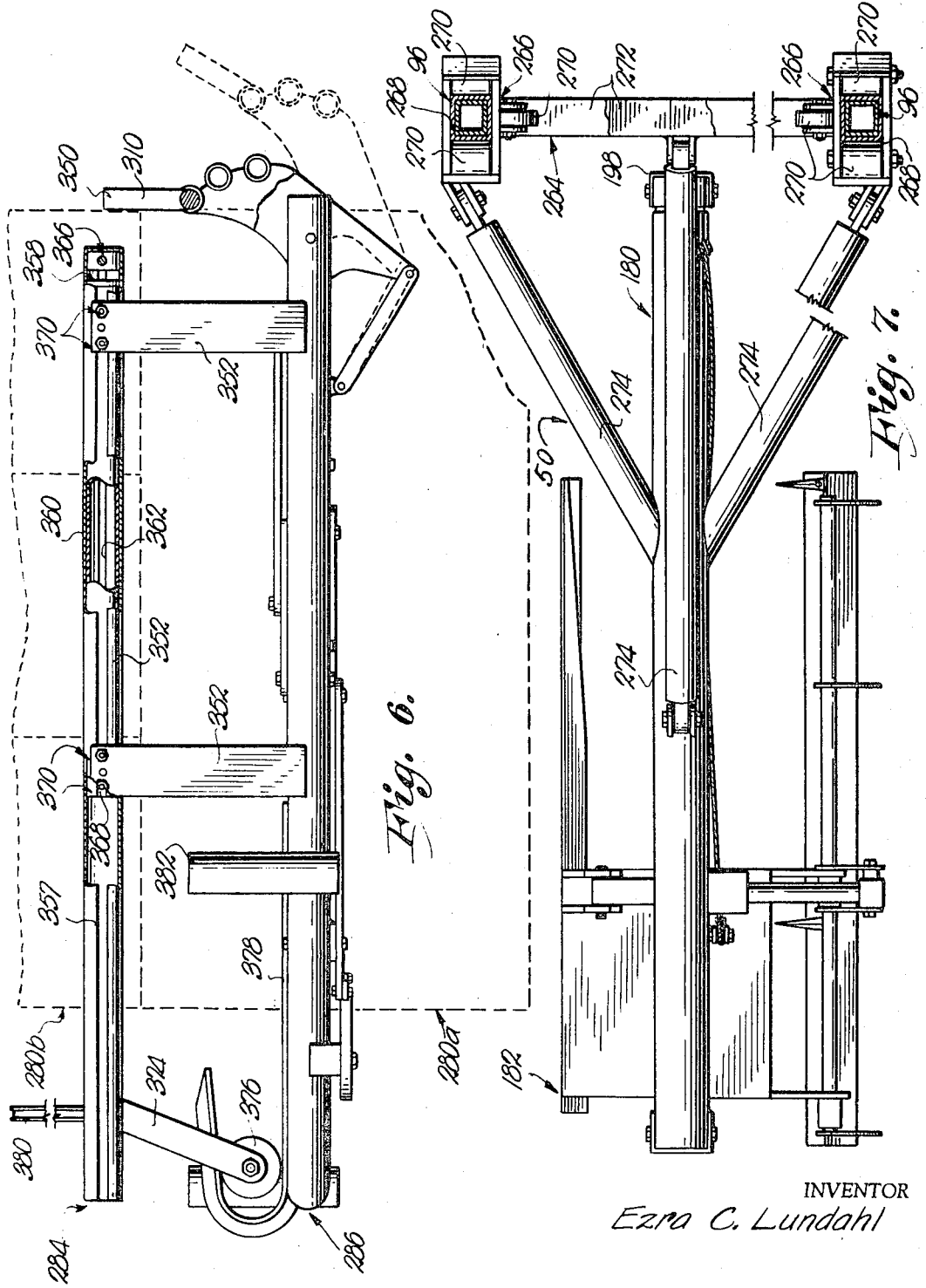

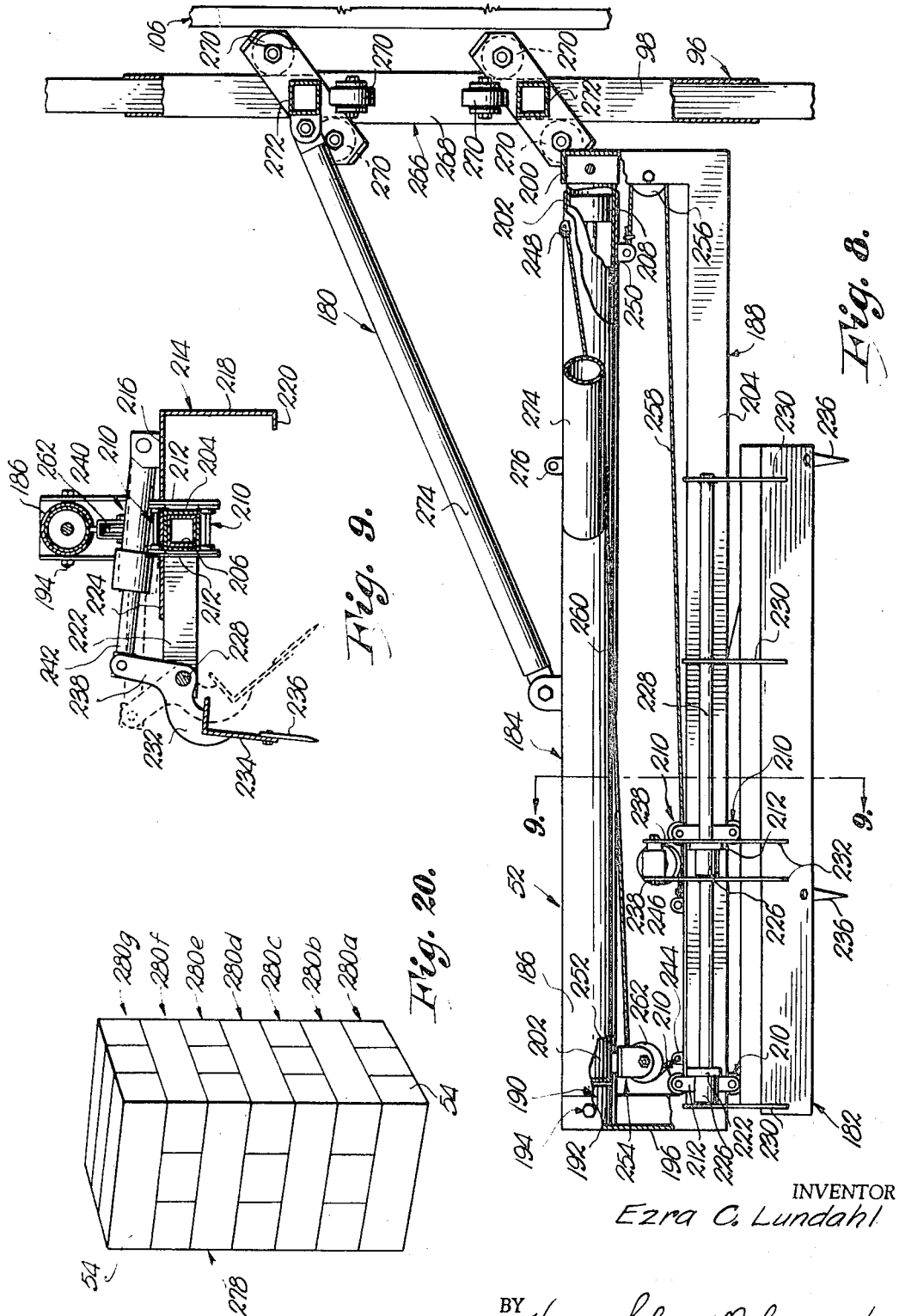

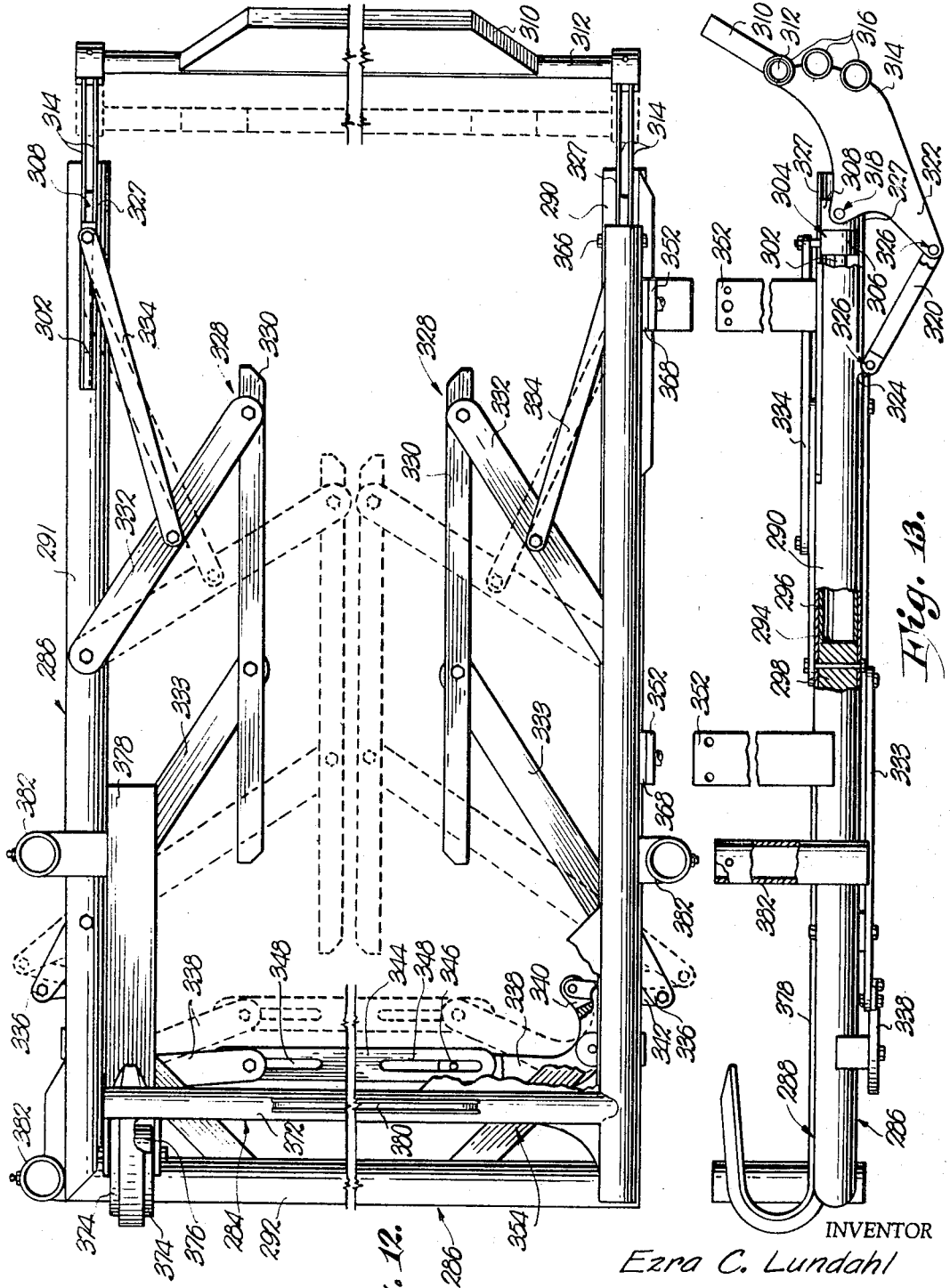

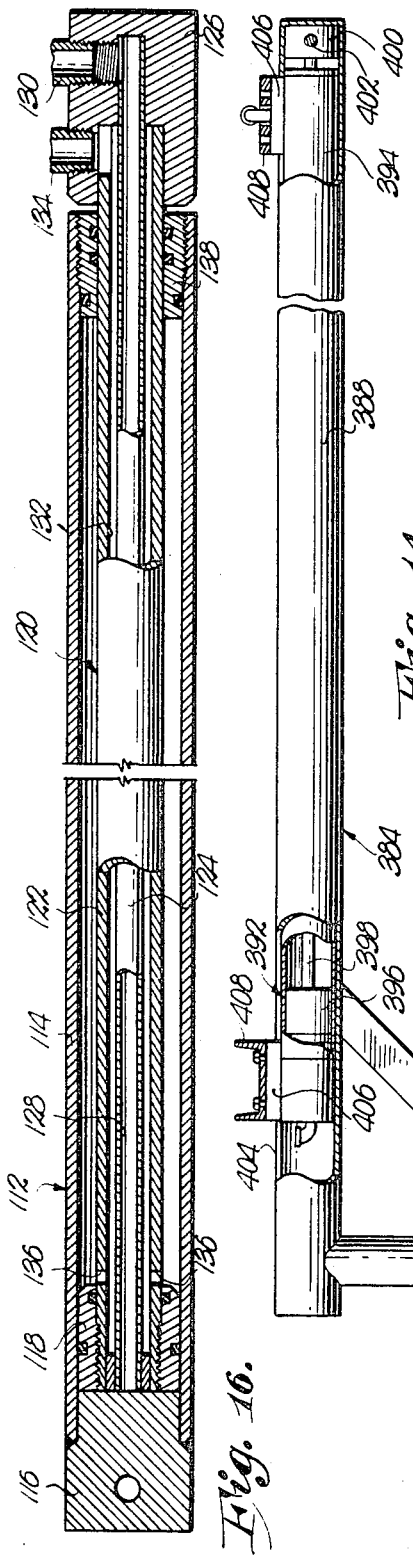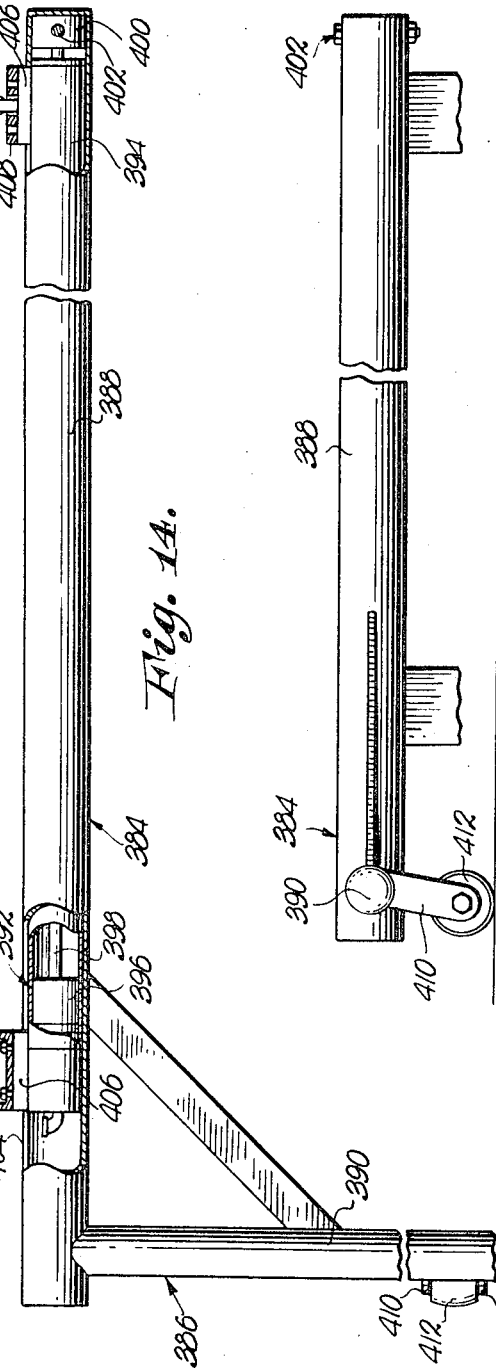

United States Patent Office 3,443,699
Patented May 13, 1969

3,443,699
MACHINE FOR HANDLING BALES
Ezra C. Lundahl, Logan, Utah, assignor to Hesston Corporation, Inc., Hesston, Kans., a corporation of Kansas
Filed Jan. 18, 1967, Ser. No. 610,065
Int. Cl. B60p 1/36
U.S. Cl. 214—6                    5 Claims

ABSTRACT OF THE DISCLOSURE

The structure disclosed herein includes hay bale loading and stacking apparatus for lifting bales of hay from the ground and arranging the same in a multiplicity of stabilized and shaped stacks of crosstied tiers having a plurality of side-by-side bales. The structure also includes an elongated bale transport which carries the apparatus along its side and has a bed for receiving the stacks from the apparatus, one at a time, until a load of stacks has been strategically placed thereon in a manner to maximize the number of individual bales in the load and permit movement of the transport over rough ground without substantial danger of topping of any of the stacks. In particular, the apparatus is provided with a crosstying turntable which is rotatable about an upright axis through an arc of 90° after each tier of bales is placed thereon, and thus, the longitudinal axes of the bales of each tier extend perpendicularly with respect to the longitudinal axes of bales of adjacent tiers. Further, a squaring compressor is provided for aligning the tiers of each stack to present a shaped column having substantially vertically, planar sidewalls.

The apparatus is provided with a bale grabber for lifting the bales from the ground and placing the same on the turntable. A bale pusher is included for arranging the bales of each tier in side-by-side relationship atop the stack, and elevators are included to raise the grabber, the pusher and the compressor, each time a tier has been completed, to the level of the next tier to be placed on the stack. The structure has a pair of shifter assemblies for shoving the stacks, one at a time, off of the turntable and onto the bed and then move the stacks along the bed to compactly load the latter. A number of hydraulically actuated piston and cylinder assemblies are provided for controlling the operation of each of the major subassemblies mentioned above.

This invention relates to farm equipment and, more particularly, to a mobile machine for automatically lifting a plurality of bale-like objects, one at a time, from the ground and onto a transport bed and arranging a maximized number of the objects into a stabilized, stacked load on the bed.

It is the primary object of the instant invention to provide a bale-handling machine and method for automatically loading a plurality of elongated bale-like objects into a stabilized, neatly arranged load of objects whereby the load is efficiently transported to a centralized location.

Another very important object of the instant invention is the provision of a method and means for arranging a multiplicity of elongated objects into stacks having a plurality of tiers of side-by-side objects, the longitudinal axes of the objects of each tier being angularly disposed with respect to the longitudinal axes of the objects of adjacent tiers to the end that the stability of each stack is maximized and transportation of the same over rough terrain is facilitated.

A further very important object of the invention is to provide a method and structure for shaping stacks of such objects to render the same more compact and thereby decrease the floor space required to store the same.

A still further very important object of the present invention is the provision of a method and mechanical apparatus for building a plurality of stacks of bales and then shifting the stacks onto and along a transport bed so that the latter may be fully loaded and the number of trips thereof to the centralized depot area is minimized.

Yet another very important object of the invention is to provide a bale-handling machine of the type described wherein all of the various steps are automatically controlled, to the end that the machine may be operated by a single operator.

In the drawing:
FIGURE 1 is a top plan view of a bale-handling machine constructed in accordance with the principles and concepts of the instant invention;
FIG. 2 is a side elevational view of the machine illustrated in FIG. 1;
FIG. 3 is a front elevational view of the machine illustrated in FIG. 1;
FIG. 4 is an enlarged, top plan view, partly in cross section, of the open framework located at the lower left-hand corner of the machine illustrated in FIG. 1;
FIG. 5 is a side elevational view of the framework of FIG. 4;
FIG. 6 is an enlarged, side elevational view, partially in cross section, illustrating the squaring compressor and small push-over of the machine illustrated in FIG. 1, and the interrelationship therebetween;
FIG. 7 is an enlarged, top plan view, partly in cross section, of the bale pickup carriage of the machine illustrated in FIG. 1;
FIG. 8 is a side elevational view, partly in cross section, of the bale pickup carriage illustrated in FIG. 7;
FIG. 9 is a cross-sectional view taken along line 9—9 of FIG. 8;
FIG. 10 is an enlarged, bottom plan view, partially in cross section, of the turntable located at the lower lefthand corner of the machine of FIG. 1, beneath the open framework thereof;
FIG. 11 is an elevational, cross-sectional view taken along line 11—11 of FIG. 10;
FIG. 12 is a top plan view of the squaring compressor of FIG. 6, the small push-over having been deleted for increased clarity;
FIG. 13 is a side elevational view, partly in cross section, of the squaring compressor of FIG. 12;
FIG. 14 is an enlarged, top plan view, partly in cross section, of the large push-over assembly located at the left-hand end of the machine of FIG. 1;
FIG. 15 is a side elevational view of the assembly of FIG. 14;
FIG. 16 is an enlarged, cross-sectional view of a piston and cylinder assembly which is typical of a number of the piston and cylinder assemblies utilized in the construction of the machine illustrated in FIG. 1;
FIG. 17 is an enlarged, cross-sectional view of the right-hand end of the assembly illustrated in FIG. 16, a restriction valve having been included to restrict the flow of fluid, outwardly of the assembly, during retraction thereof;

FIG. 18 is an enlarged, cross-sectional view taken along lone 18—18 of FIG. 17;

FIG. 20 is a perspective view of a stack of cross-tied tiers of side-by-side bales produced by the method and apparatus of the instant invention.

Figure 10:
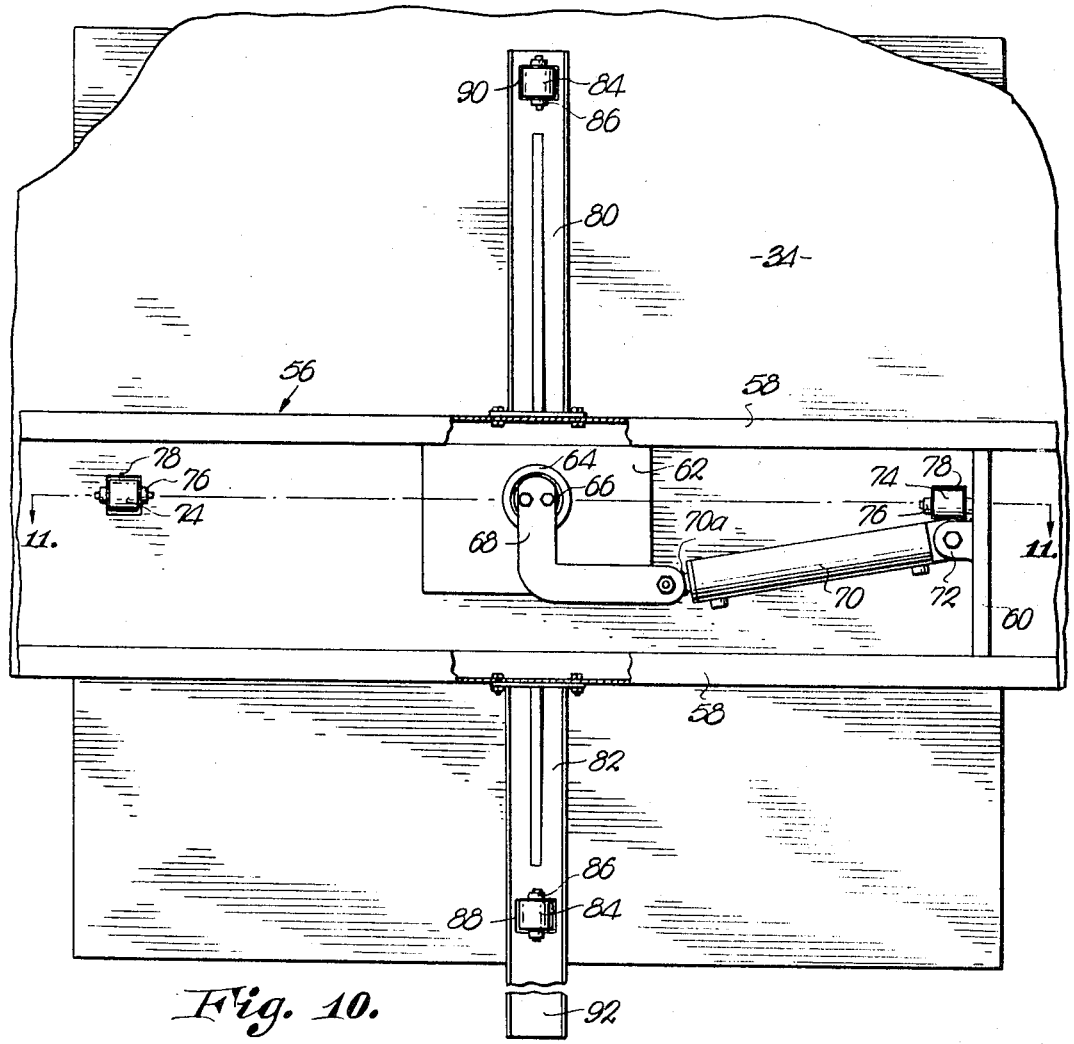

A bale-handling machine constructed in accordance with the concepts and principles of the instant invention is illustrated in FIGS. 1, 2 and 3 and is broadly designated by the numeral 30. Machine 30 includes a bale transport in the nature of an elongated wagon 32 provided with a longitudinally extending, flat bed 34, a pair of wheel assemblies 36 on opposite sides thereof which may be constructed in accordance with the wheel assemblies illustrated in my Patent No. 3,241,696, issued Mar. 22, 1966, and entitled "Apparatus for Stacking, Loading and Unloading Bulk or Bale-Like Objects," and a hitch 38 which is constructed in a conventional manner.

Bed 34 is provided with a shifting assembly 40 constructed generally in accordance with the principles disclosed in my above-mentioned patent, as well as my Patent No. 3,003,780, issued Oct. 10, 1961, and entitled "Vertically Adjustable Tandem-Type Running Gear for Vehicles." Assembly 40 includes a piston and cylinder assembly 42, a cable 44 and a push bar 46 which is shiftable longitudinally of bed 32, in response to movement of cable 44 under the influence of piston and cylinder assembly 42 upon actuation of the latter. The manner in which assembly 42 and cable 44 are interconnected to move bar 46 along bed 34 is fully described in my above-mentioned patents and thus, a detailed description of the same is not necessary in the present disclosure.

Machine 30 includes an elevated bale-receiving platform or support, in the nature of a turntable 48. Turntable 48 is mounted adjacent bed 34 and partially overlies the same as can be seen viewing FIG. 1. Turntable 48 provides a station for receiving bales from a structure 50 which is provided with means in the nature of a carriage-mounted bale grabber assembly 52 positioned for lifting elongated hay bales from the ground and stacking, placing or depositing the same onto turntable 48. In this respect, it is to be noted that a hay bale 54 is illustrated in FIG. 1 in its position after having been grasped by assembly 52 and prior to the placing of the same upon turntable 48.

Figure 11:
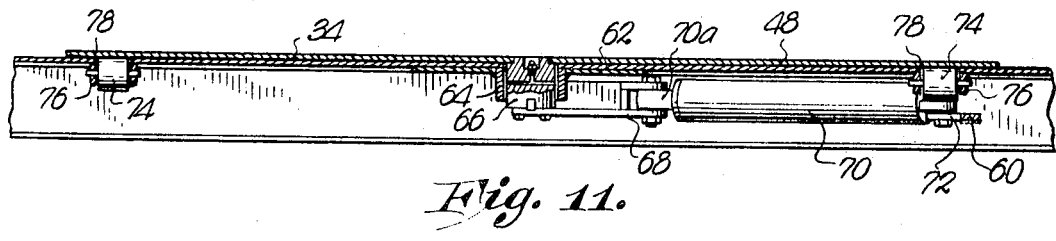

Viewing FIGS. 10 and 11, it can be seen that turntable 48 is mounted at the side of bed 34 for rotation relative thereto about an upright axis. Wagon 32 is provided with a frame 56 underlying bed 34 at the edge thereof adjacent turntable 48. Frame 56 includes a pair of spaced C-beams 58 having a support brace 60 extending therebetween. A mounting plate 62 extends centrally from one beam 58 and toward the other beam 58 in parallel relationship with respect to bed 34 and therebeneath, as can be seen viewing FIGS. 10 and 11.

Plate 62 mounts a boss 64 disposed to receive a shaft 66 journalled therethrough. Shaft 66 is rigidly attached to turntable 48 as can be seen viewing FIG. 11, and a bell crank 68 is rigidly attached to the lower end of shaft 66. A piston and cylinder assembly 70 is swingably mounted on a tab 72 rigid with brace 60, and the piston rod 70a thereof is pivotally attached to crank 68.

A pair of support rollers 74 are mounted on the underside of bed 34 by appropriate mounting structures 76 for projection through corresponding openings 78 in bed 34 as can best be seen viewing FIG. 11. A pair of support arms 80 and 82 extend laterally from respective beams 58 for mounting support rollers 84 on brackets 86. The roller 84 on arm 82 extends through an opening 88 in arm 82.

A similar opening 90 is provided in arm 80 and it is to be understood that an opening (not shown) is aligned with opening 90 to receive the roller 84 extending therethrough. Thus, it can be seen that turntable 48 is supported by rollers 74 and 84 for rotation about the axis of shaft 66. It is to be noted that arm 82 has a length 92 which extends beyond the edge of turntable 48 for a purpose to be described hereinafter.

A vertically shiftable, open framework 94 extends upwardly from wagon 32 above turntable 48. Framework 94 is generally triangular in configuration as can be seen viewing FIG. 4 and includes a support post 96 at each corner thereof. The lower end of each post 96 is rigidily carried by wagon 32 and each post includes an outer, hollow shell 98 and an inner leg 100 telescopically received within shell 98. It is to be noted that shells 98 and the legs 100 received therein are substantially rectangular in transverse cross-sectional configuration whereby shells 98 guide the legs 100 during vertical movement of the latter.

A generally triangular superstructure 102 is disposed at the tops of legs 100 and is attached to the latter by nut and bolt assemblies 104 as can be seen viewing FIG. 4. A piston and cylinder assembly 106 is located to the inboard side of each post 96. Each assembly 106 includes a cylinder 108 attached to superstructure 102 by nut and bolt means 110.

Each assembly 106 is similar to the piston and cylinder assembly shown in FIG. 16 and generally designated by the numeral 112. Assembly 112 includes a cylinder 114 having an end closure 116 at the left-hand end thereof viewing FIG. 16. A piston 118 is slidably carried within the hollow bore of cylinder 114 for reciprocation between the ends thereof. Piston 118 is mounted on a piston rod 120 comprising a pair of coaxial tubes 122 and 124 carried by an external head 126. Tube 124 has a passageway 128 therein in communication with a conduit 130. The outer surfaces of tube 124 are spaced from the inner surfaces of tube 124 presenting a channel 132 in communication with a conduit 134. Channel 132 is open to the interior of cylinder 114 on the right-hand side of piston 118 through a pair of ports 146. Tube 124 extends through piston 118, and passageway 128 is open to the interior of cylinder 114 at the left-hand side of piston 118. A packing 138 is disposed at the right-hand end of cylinder 114 in surrounding relationship with respect to rod 120. Thus, head 126 may be rigidly secured in a fixed position while cylinder 114 and end closure 116 are extended and retracted. In this respect, it is to be noted that when conduit 130 is connected to a source of fluid pressure, the fluid will travel through passageway 128 and push closure 116 relatively away from piston 118. Conversely, when conduit 134 is provided with a source of fluid pressure, fluid traveling through channel 132 and ports 136 will force packing means 138 relatively away from piston 118 thus retracting cylinder 114 toward head 126.

Each assembly 106 is provided with a mounting head 140 similar to the head 126 of assembly 112. Thus, cylinders 108 are movable relative to heads 140 toward and away from the latter. In this respect, it is to be noted that posts 96 provide lateral support for superstructure 102 during raising and lowering of the latter by extension and retraction of cylinders 108.

An elongated support tube 142 is mounted atop superstructure 102 as can be seen viewing FIGS. 4 and 5. A piston and cylinder assembly 144 is received within tube 142. Assembly 144 is similar in construction to assembly 112 and includes a head 146 rigidly attached to the left-hand end of tube 142 by nut and bolt assembly 148. Assembly 144 also includes an extendible-retractable cylinder 150 and the end closure 152 for cylinder 150 extends exteriorly of tube 142 and mounts a sheave assembly 154 for movement therewith toward and away from a collar 156 on the right-hand end of tube 142. Another sheave assembly 158 is rigid with the left-hand end of tube 142. A vertical flange 160 depends from tube 142 and mounts a pulley 162 for rotation about an axis parallel to the axis of sheaves 158 and 154.

A cable 164 is looped around sheaves 158 and 154 and pulley 162 in the manner illustrated in FIG. 5, and the end 166 thereof is attached to the housing of sheave 154. Thus, upon extension of cylinder 150 and therefore sheave 154, the upper stretch 168 of cable 164 and the stretch 170 thereof which depends from sheave 158, move linearly three times as far as the linear movement of sheave 154. A pulley assembly 172 is positioned on superstructure 102 at the top of each cylinder assembly 106, and a cable 174 is trained around each assembly 172 and has an end 176 attached to a respective outer shell 98. The dispositions of ends 176 with respect to shells 98 are best illustrated in FIGS. 2 and 3. Thus, upon extension of the cylinders 108 of assemblies 106, the stretches 178 of cables 174 move linearly, in a vertical direction, twice as far as cylinders 108.

Grabber assembly 52 includes a carriage 180 mounted for vertical movement, and a dolly 182 mounted on carriage 180 for horizontal movement thereon. Carriage 180 includes a generally rectangular, expandable frame 184. Frame 184 has an upper, transversely circular support housing 186 and a lower, transversely square, dolly-supporting track 188. A piston and cylinder assembly 190 is received within housing 186 and has a head 192 attached to housing 186 through the medium of nut and bolt means 194. A frame end 196 is also attached to housing 186 with nut and bolt means 194 and extends downwardly therefrom.

Frame end 198 at the opposite end of frame 184 is attached to the closure 200 of the cylinder 202 of assembly 190. Track 188 includes an outer portion 204 and an inner portion 206 slidably received therein (FIG. 9) and portion 204 is integral with end 198, while portion 206 is integral with end 196. Thus, upon extension of cylinder 202 by the introduction of fluid to the right-hand side of the piston 208 of assembly 190, end 198 and outer portion 188 move rightwardly (FIG. 8) while housing 186, piston 208, end 196, and portion 206 remain stationary. Dolly 182 is shiftable along outer portion 204 and includes a plurality of wheel and axle assemblies 210 arranged in the manner illustrated in FIGS. 8 and 9. A plurality of upright straps 212 interconnect vertically disposed assemblies 210 at each side and at each end of dolly 182. A plate 214 has a horizontal portion 216 which is attached to the straps 212 and overlies portion 204 of track 188 in close proximity thereto. Plate 214 also has a portion 218 which depends from the right-hand side of portion 216, and an inturned flange 220 extending from the lower edge of portion 218 as can be seen viewing FIG. 9.

A pair of arms 222 extend leftwardly from the straps 212 on the left-hand side of dolly 182 in underlying and supporting relationship with respect to the left-hand end 224 of the horizontal portion 216 of plate 214 and a support bearing 226 extends laterally from each arm 222. A grabber shaft 228 is journalled through bearings 226 and mounts a plurality of arms 230 and 232 which depend therefrom for rotation therewith. A transversely L-shaped plate 234 is attached to the free end of arms 230 and 232, and a plurality of sharpened tines 236 are carried on the lower edge of plate 234. Arms 232, located generally centrally of plate 234, have lever portions 238 extending upwardly therefrom beyond shaft 228. A piston and cylinder assembly 240 is pivotally mounted on portion 216 of plate 214 and has a piston rod 242 pivotally engaged with lever portions 238 of arms 232. Upon actuation of assembly 240, rod 242 is extended to move arm 232, plate 234 and tines 236 into the dashed-line position indicated in FIG. 9, and a bale of hay situated between tines 236 and flange 220 is grasped and received thereby.

A pair of eyelets 244 and 246 are mounted on portion 216 of plate 214 and are spaced longitudinally of track 188. Another pair of eyelets 248 and 250 are rigid with the right-hand end of housing 186. Housing 186 has a longitudinally extending slot 252 on the lower side thereof receiving a pulley assembly 254 depending downwardly from cylinder 202, therethrough. A sheave 256 is carried by end 198 of frame 184, and a cable 258 is trained from eyelet 246 around sheave 256 and is connected to eyelet 250. Similarly, a cable 260 is trained from eyelet 248 around the pulley 262 of assembly 254 and is attached to eyelet 244 on dolly 182. Upon extension of the cylinder 202 of assembly 190, end 198 of frame 184 is moved rightwardly away from end 196 and pulley assembly 254 on cylinder 202 and sheave 256 move rightwardly therewith. Thus, the outer portion 204 of track 188 is reciprocable longitudinally of frame 184 in a horizontal direction, while the sheave and cable means presented by assembly 254, sheave 256, and cables 258 and 260 move dolly 182 relative to the outer portion 204 of track 188, longitudinally thereof at twice the speed that portion 204 of track 188 is reciprocated. In this manner, dolly 182 moves to the right-hand end of portion 204, while the latter moves rightwardly into a position overlying turntable 48.

Mounting means in the nature of a cart 264 is provided for supporting carriage 180 and dolly 182 in cantilevered relationship with respect to the posts 96 at the left-hand end of machine 30 (FIG. 1). Cart 264 includes a wheeled sleeve assembly 266 for each of the respective posts 96. Each assembly 266 includes a vertically disposed sleeve portion 268 extending longitudinally of the corresponding post 96 therefor. A plurality of rollers 270 are disposed at the upper and lower ends of each sleeve 268 for guiding cart 264 along post 96 as best shown in FIGS. 7 and 8. Upper and lower crossbars 272 extend between assemblies 266, while a trio of braces 274 suspend carriage 180 from cart 264. Carriage 180 is provided with a cable bracket 276 which is attached to the lower end of stretch 170 of cable 164, and it can be seen that, upon extension of the cylinder 150 of assembly 144 located atop framework 94, carriage 180, and thereby dolly 182, will be moved upwardly. Conversely, upon retraction of cylinder 150, carriage 180 and dolly 182 will be lowered.

Before proceeding further with the description of the machine 30, it will be helpful to understand the nature of the manner in which the hay bales 54 are arranged by structure 50 and turntable 48. Referring to FIG. 20, a stack 278 of crosstied tiers 280a, 280b, 280c, 280d, 280e, 280f and 280g of side-by-side bales such as 54, is illustrated. The longitudinal axes of the bales of each tier, for example, tier 280d, are disposed substantially perpendicularly with respect to the longitudinal axes of the bales of each adjacent tier, for example, tiers 280c and 280e.

Referring to FIG. 1, stack 278 is shown after the same has been partially constructed. Tier 280a has been produced and turntable 48 has been rotated, and the first two bales 54a and 54b of tier 280b, have been placed atop tier 280a. The rectangular space beside bale 54b (FIG. 1) presents a position 228 for placing the next bale 54 in the stack. Subsequent to the time that the next bale 54 is placed at position 282, turntable 48 will again be rotated 90° so that tier 280c can be placed atop tier 280b with the longitudinal axes of the bales of tier 280c disposed substantially perpendicular to the longitudinal axes of the bales of tier 280b. It is to be understood that each bale of a given tier, 280a–280b, is placed at the same position 282 and bale moving means 284 is provided for shifting the bale laterally to clear the position 282 for receiving the next successive bale.

Generally speaking, although the size of the bales 54 vary somewhat, the relative dimensions of the same are somewhat standardized. That is to say, the sides of the bale are generally in the ratio of 2:3:6. Thus, when three bales are placed in side-by-side relationship with each bale resting on its 2 x 6 side, three bales placed in side-by-side relationship will present a 6 x 6 square configuration with a relative height equivalent to 3. Immediately upon completion of a tier, for example 280a, turntable 48 is rotated 90° so that the longitudinal axes of the bales extend generally laterally with respect to bed 34 of machine 30.

Shiftable power means in the nature of a mechanism 286 is provided for compressing and squaring the tier 280a and aligning the same with adjacent tiers so that an evenly shaped stack 278 is presented. Viewing FIGS. 6, 12 and 13, mechanism 286 is illustrated in detail. It is to be understood that in FIGS. 6 and 12, bale-moving means 284 is illustrated in its operative position atop mechanism 286, while in FIG. 13, means 248 has been deleted for improved clarity. Mechanism 286 includes a generally U-shaped support frame 288 having a pair of opposed, transversely circular, tubular legs 290 and 291 and a bight 292. Each of the legs 290 and 291 receive therein a piston and cylinder assembly 294 having a cylinder 296 and a cylinder closure 298. Closures 298 are rigidly attached to respective legs 290 and 291 by nut and bolt means 300. A piston rod 302 extends rightwardly from assembly 294 and mounts a head 304 thereon. Head 304 includes a transversely circular plug 306, and a rectangular flange 308 extending rightwardly from plug 306. An end stop 310 is mounted on a shaft 312, the latter extending between a pair of wing plates 314. Each plate 314 is provided with a plurality of bosses 316 for receiving the opposite ends of shaft 312. It is to be appreciated that the latter is rotatably received by a pair of selected bosses 316 whereby the disposition of stop 310 can be adjusted by rotating shaft 312 and by moving shaft 312 to a different pair of opposed bosses 316. Plates 314 are rotatably mounted on respective flanges 308 as at 318, and a camming bar 320 extends between the lower end 322 of a corresponding plate 314 and a mounting tab 324 rigid with a respective leg 290.

Pivot means 326 are provided at each end of each bar 320 for connecting the same to a respective end 322 and tab 324 and upon leftward movement of flange 308 during the retraction of rod 302 plate 314 will be rotated about point 318 by the camming action of bar 320 on plate 314. In this respect, it is to be noted that each of the legs 290 and 291 are provided with upper and lower slots 327 extending inwardly from their right-hand ends receiving plates 314 therein. Thus, stop 310 will be rotated and shifted leftwardly from the solid-line position to the dashed-line position in FIG. 12, and from the dashed-line position to the solid-line position in FIG. 6.

A pair of opposed side squeezer assemblies 328 are mounted on corresponding legs 290 and 291. Each assembly 328 includes a bale contacting bar 330 and a pair of elongated, parallel arms 332 and 333, the latter being pivotally mounted at opposite ends on respective bars 330 and legs 290 and 291 to present a pair of opposed parallelograms. A connecting rod 334 is pivotally mounted on each plug 306 and extends therefrom to the adjacent arm 332 of the corresponding assembly 328 for swingable connection therewith. Thus, upon retraction of rod 302, and the resultant leftward movement of plugs 306, assemblies 328 are shifted from the solid line positions of FIG. 12 and into the dashed-line positions thereof. Manifestly, this movement takes place simultaneously with the movement of stop 310 from its solid-line position to its dashed-line position in FIG. 12. Arms 333 extend beyond their pivot point on legs 290 and 291 and present end portions 336. A pair of bell cranks 338 are swingably mounted on corresponding legs 290 and 291 and have ends 340 disposed adjacent the portion 336 of a corresponding arm 333.

An elongated link 342 is pivotally mounted at opposite ends thereof to a corresponding portion 336 and its bell crank end 340 as can be seen viewing FIG. 12. Thus, during movement of assemblies 328 from their solid-line positions to their dashed-line positions, bell cranks 338 likewise move from their solid-line positions to their dashed-line positions. A slotted bar 344 extends between bell cranks 338, each of the latter being provided with a pin 346 slidably received within a corresponding slot 348 of the bar 344. Hence, bar 344 moves from its solid-line position to its dashed-line position upon rotation of bell cranks 338 from their solid-line positions into the dashed-line positions thereof. It is to be appreciated, viewing FIG. 12, that the relative distance between legs 290 has been greatly reduced with respect to the distance from bight 292 to stop 310. It is to be understood that when bars 330 and 344 and stop 310 are in their dashed-line positions, the distance between opposite bars 330 is approximately equal to the distance from bar 344 to stop 310. Viewing FIG. 6, tier 280a is illustrated in dashed lines, and it can be seen that the position of tier 280a will be established by the action of mechanism 286, while the latter compactly compresses the tier 280a into the shape of a square. Viewing FIG. 6, the upper end 350 of stop 310 projects beyond the upper surface of tier 280a to provide a limit for the distance means 284 can push the bales of tier 280b rightwardly.

A pair of support brackets 352 extend upwardly from leg 290 as can be seen viewing FIGS. 6 and 12, for mounting means 284. Means 284 include a generally L-shaped frame 354 having a tubular housing 356 extending substantially parallel to leg 290 thereabove. A piston and cylinder assembly 358 is received within housing 356 and includes a cylinder 360 and a piston rod 362. Rod 362 extends rightwardly beyond the end of cylinder 360 and presents a head 364 which is rigidly connected with housing 356 by nut and bolt means.

Cylinder 360 is provided with a pair of horizontal flanges 368 which are attached to the upper ends of brackets 352 by nut and bolt means 370. A bale-engaging bar 372 extends laterally from housing 356 toward the leg 291 of mechanism 286 as can be seen viewing FIG. 12. A pair of spaced legs 374 extend downwardly and rearwardly from bar 372 and mount a wheel 376 for rotation about a horizontal axis therebetween. A track 378 is attached to the inboard side of leg 291 at the left-hand end thereof mounting wheel 376 and therefor frame 354 for movement longitudinally of legs 290 and 291. Viewing FIG. 6, it can be seen that upon extension of piston rod 362, head 364, housing 356, bar 372, legs 374 and wheel 376 will be moved rightwardly. It is to be noted that housing 356 has a longitudinal slot 357 therein receiving flanges 368 therethrough. Thus, slot 357 moves relative to flanges 368. A rack 380 disposed atop bar 372 is disposed, along with the latter, to contact a bale of tier 280b (FIG. 6) and move the same toward stop 310.

Mechanism 286 is provided with three hollow sleeves 382 mounted on the outboard sides of legs 290 and 291 as can be seen viewing FIG. 12. Sleeves 382 slidably receive a respective cylinder 108 therein as is best illustrated in FIG. 2. Thus, mechanism 286 is vertically reciprocable along cylinders 108, and thus, frame 354 is likewise movable vertically reciprocable therewith. The lower ends of stretches 178 are connected with a corresponding sleeve 382, and therefore, as cylinders 108 are extended, mechanism 286 and frame 354 are elevated. Manifestly, because of the pulley arrangement described hereinabove, mechanism 286 and frame 354 are moved relatively twice as far as cylinders 108. Thus, each time an individual tier of stack 278 has been completed, mechanism 286 and pushover frame 354 are elevated to the level of the next tier.

Apparatus in the nature of a large pushover assembly 384, similar to means 284, is provided for shifting or transferring completed stacks 278 from turntable 48 and onto bed 34. Viewing FIGS. 14 and 15, it can be seen that assembly 384 comprises an L-shaped structure 386 having an elongated support tube 388 and a laterally extending, stack-engaging arm 390. A piston and cylinder mechanism 392 is received within tube 388 and has a cylinder 394, a piston 396 and a piston rod 398. Rod 398 extends rightwardly beyond the end of cylinder 394 and mounts a head 400 which is rigidly attached to tube 388 by nut and bolt means 402. Tube 388 is provided with a longitudinally extending slot 404 on the outboard side thereof, and a pair of wings 406 are rigid with cylinder 394 and extend outwardly therefrom through slot 404 for connection to mounting brackets 408, the latter being rigid with bed 34.

A pair of spaced brackets 410 extend downwardly from arm 390 and rotatably mount a roller 412 therebetween. Wheel 412 is disposed to ride on length 92 of arm 82 which extends outwardly beyond turntable 48. It can be seen that upon extension of rod 398 and the resultant rightward movement of head 400, tube 388 and arm 390 will be shifted in a direction to move stacks of bales from turntable 48 laterally across bed 34.

Often, it is desirable to restrict the speed of movement of a cylinder in one direction or the other. This is particularly true, for example, in the case of piston and cylinder assembly 144 which raises and lowers structure 50. The weight of structure 50 will tend to rapidly retract cylinder 150 toward head 146 if fluid were allowed to move freely from port 414 of head 146. A check valve 416 is connected externally of port 414 to restrict flow of fluid moving outwardly from port 414 while permitting flow of fluid in the opposite direction with minimal restriction. Valve 416 is provided with a passageway 418 therethrough, and an inner, annular shoulder 420 provides a valve seat.

A hollow plug 422 has a frusto-conical end 424 terminating in a small opening 426 at the upper extremity thereof (FIG. 17). A coil spring 428 bears against an annular keeper 430 and yieldably biases plug 422 toward seat 420. Plug 422 is also provided with a portion of reduced diameter 432 located between end 424 and the main body portion 434 thereof. A plurality of openings 436 extend laterally through the walls of portion 432 in communication with an annular chamber 438 surrounding portion 432. During movement of fluid outwardly from port 414, the fluid pressure and the action of spring 428 maintain end 424 in contact with seat 420 and thus the fluid must pass through the small opening 426 at the upper extremity of end 424. On the other hand, during movement of fluid toward port 414, the force of the fluid will move plug 422 downwardly against the bias of spring 428, disengaging end 424 and seat 420. Hence, fluid is permitted to pass between end 424 and seat 420 and into the chamber 438 from where openings 436 provide relatively unrestricted flow downwardly through the interior of plug 422 and into port 414.

Figure 19:
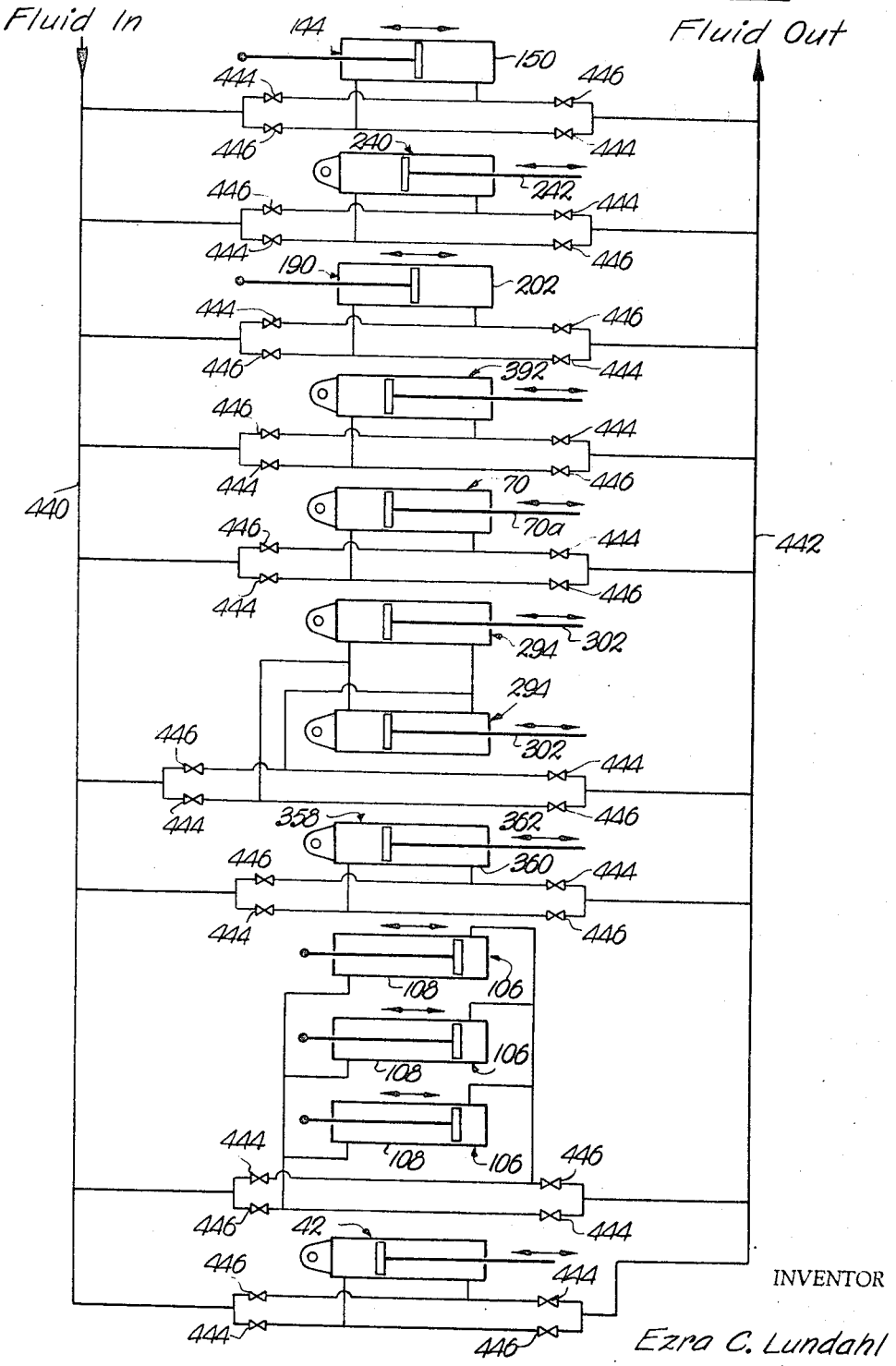
FIG. 19 is a schematic view illustrating the connection of the various piston and cylinder assemblies of the machine illustrated in FIG. 1, with a source of fluid pressure.

Each of the piston and cylinder assemblies 42, 70, 106, 144, 190, 240, 294, 358 and 392 are connected with a source of fluid pressure and are provided with a number of valves for directing fluid into and out of the appropriate cylinder on the proper side of the piston thereof. The hydraulic supply and return means is shown schematically in FIG. 19 wherein the fluid inlet line is designated by the numeral 440 and the fluid outlet line is designated by the numeral 442. It is to be understood that line 440 is connected to the discharge of a fluid pump or the like (not shown), while line 442 is connected to a reservoir for fluid (not shown), the latter, of course, being connected to the suction side of the fluid pressure pump.

Assemblies 106, 144 and 190 are constructed similar to assembly 112 and are provided with a movable cylinder. The remaining assemblies are conventional insofar as the cylinder is maintained stationary while the piston and rod are extended and retracted. Each assembly is provided with a pair of valves 444 and it can be seen that, upon opening the valves 444 of any of the assemblies shown in FIG. 19, the appropriate piston or cylinder, as the case may be, will be extended. Conversely, each assembly is provided with a pair of valves 446, and it can be seen that whenever the valves 446 of an assembly are opened, the corresponding piston or cylinder, as the case may be, will be retracted. Manifestly, any of the valves 444 or 446 may be opened manually by an adjacent or a remote lever and linkage electrically through the use of a solenoid-type actuator, or hydraulically through the use of a fluid pressure motor or the like.

OPERATION

During the operation of machine 30 the same is attached to a tractor or the like (not shown) and moved thereby in a direction longitudinally of the wagon 32. The hay bales 54, of course, are deposited at various locations in a hay field. The wagon 32 is steered in a direction to cause a bale 54 to enter a loading mouth 448 presented by a pair of spaced guides 450 and 452, guide 450 being provided with a guide wheel 454 which hugs the ground and causes the disposition of a bale 54 to be adjusted until the longitudinal axis of the same extends substantially parallel to the longitudinal axis of wagon 32 as can be seen viewing FIG. 1.

Machine 30 continues to move toward bale 54 until the latter is contacted by a trigger mechanism 456 disposed within mouth 448. For purposes of explanation, the sequence of machine 30 will be described at a time when machine 30 is completely devoid of bales. Upon contact between mechanism 456 and the first bale 54, the valve 446 of assembly 144 are opened to cause cylinder 150 to retract, thus lengthening stretch 170 of cable 164 and causing structure 50 to be lowered. When assembly 52 has been lowered sufficiently to contact a bale 54, the valves 446 of cylinder assembly 144 are closed to preclude further downward movement of structure 50, and the valves 444 of piston and cylinder assembly 240 are opened to cause extension of piston rod 242 and move tines 236 into engagement with the sides of the bale 54 and clamp the latter between tines 236 and flange 220. After the bale has been clamped between tines 236 and flange 220, the valves 444 of piston and cylinder assembly 144 are opened to cause cylinder 150 to move toward its extended position. After structure 50 and, therefore, bale 54 have been elevated sufficiently to clear mechanism 286, the valves 444 of cylinder assembly 144 are closed, whereupon the upward movement of structure 50 is halted, at this time, the latter being in the approximate position indicated in FIG. 2.

Now, the valves 444 of piston and cylinder assembly 190 are opened and cylinder 202 is extended to move portion 204 of track 188 into its extreme rightward position. At the same time, pulley 256 and cable 258 cooperate to move dolly 182 toward the right-hand end of portion 204 and position the bale 54, carried by dolly 182, above the position indicated by the numeral 282. After cylinder assembly 190 has been fully extended and dolly 182 has moved to its extreme rightwardly disposed position, valves 444 of assembly 240 are closed and the valves 446 thereof are opened to retract rod 242 and thereby release the bale 54 for gravitation onto position 282.

During the construction of the first tier 280a, the operation of machine 30 is slightly different from the operation of the same during the construction of subsequent tiers. During the construction of tier 280a, and after the first bale 54 has been deposited in space 282, the valves 444 of piston and cylinder assembly 392 are opened to extend rod 398. During the extension of rod 398, arm 390 is moved in a direction laterally of bed 34 and contacts the bale 54 in space 282 and moves the same sufficiently far to clear space 282 for the reception of the next bale. Two more bales are picked up in the manner described above to complete tier 280a.

Upon completion of tier 280a, the valves 444 of piston and cylinder assembly 70 are opened to extend rod 70a and rotate turntable 48 through an arc of 90°. After turntable 48 and, therefore, tier 280a have been rotated 90°, the valves 446 of assemblies 294 are opened to retract rods 302 and thereby move stop 310, assemblies 328 and bar 344 into engagement with tier 280a to square and shape the same and position tier 280a in its proper stack-forming position on turntable 48. It is to be understood that compressor mechanism 286 is maintained in its actuated condition throughout the construction of the next succeeding tier, in this case, 280b. Furthermore, it is to be noted (FIG. 6) that the end 350 of stop 310 extends upwardly beyond tier 280a.

After structure 50 has operated to deposit the first bale of tier 280b in position 282, the valves 444 of piston and cylinder assembly 358 are opened to extend rod 362 and move bar 372 of means 284 against the bale to move the latter longitudinally of legs 290 and 291 of mechanism 286. After each bale has been moved laterally sufficiently far to clear position 282, structure 50 again is cycled upon movement of machine 30 into position to pick up the next bale 54. Actuation of structure 50 and means 284 is continued until the three bales of tier 280b have been positioned atop tier 280a. At this time, the valves 446 of assemblies 294 are closed and the valves 444 thereof are opened to extend rod 302 and thereby release mechanism 286 from tier 280a. The valves 444 of assembly 70 are closed, and the valves 446 thereof are opened to retract rod 70a and rotate turntable 48 through an arc of 90° in the opposite direction to thereby rotate the bales of tier 280b into a position where their longitudinal axes extend substantially perpendicular to the longitudinal axes of the bales to be deposited in tier 280c.

After rotation of tiers 280a and 280b, the valves 444 of assemblies 106 are opened to cause cylinder 108 to extend upwardly and thereby raise mechanism 286 and means 284 thereon through the action of pulley assemblies 172 and cables 174. After mechanism 286 has been raised the height of one tier, the valves 444 of assemblies 106 are closed to maintain compressor mechanism 286 in operational disposition with respect to tier 280b. Again, the valves 446 of assemblies 294 are opened to cause compressor mechanism 286 to tightly engage the bales of tier 280b and position the same in substantially exact alignment with tier 280a. The foregoing operations are continued until a stack 278 is completed. In this respect, it is to be understood that each stack 278 includes approximately seven tiers 280a–280g. The longitudinal axes of the bales of each tier are disposed at right angles with respect to the longitudinal axes of the bales of adjacent tiers. Thus is produced a stack 278 of crosstied tiers 280a–280g having a plurality of side-by-side bales 54.

Upon completion of a stack 278, the valves 444 of assemblies 106 are opened to extend cylinders 108 and lift compressor mechanism 286 beyond the top of the stack 78. The valves 444 of the assemblies 106 are then closed to maintain the compressor 186 in its elevated position and the valves 444 of assembly 392 are opened to extend rod 398 and cause arm 390 to contact the stack and move the same laterally of bed 34 into the position indicated in dashed lines at the upper left-hand corner of FIG. 1. The foregoing operations are continued until a second stack 278 of crosstied tiers of bales has been completed, at which time cylinder assembly 392 is again actuated to move the second stack of bales into a position alongside the first stack. After the two stacks have been positioned as indicated in the dashed lines at the left-hand end of bed 34 in FIG. 1, the valves 444 of assembly 42 are opened to extend assembly 42 and cause push bar 46 to move rightwardly into engagement with the group of stacks formed at the left-hand end of bed 34, and move the same longitudinally of bed 34 toward the position indicated by the dashed lines at the right-hand end of bed 34. Manifestly, all of the foregoing operations are continued until a compact, neatly arranged bale load has been deposited on bed 34.

It can be seen that a bale load which has been produced by the method and machine of the instant invention will contain a maximum number of individual bales. Furthermore, the stacks of crosstied tiers of bales will possess extreme stability so that the wagon 32 may be easily and efficiently transported over rough terrain without the danger of any of the stacks thereon toppling. Manifestly, all of the objects, purposes and aims of the instant invention have been fulfilled in a substantial sense in the machinery and method described hereinabove.

Having thus described the invention, what is claimed as new and desired to be secured by Letters Patent is:

1. A bale stacking wagon including:
   a mobile support having an elevated supporting surface;
   an open framework extending upwardly from said surface;
   a carriage extending laterally and outwardly from said framework;
   means mounting the carriage for vertical reciprocation on the framework;
   a dolly shiftable on said carriage and provided with bale-receiving means, said bale receiving means including a fixed element and a movable element pivotally mounted on said dolly for swinging toward or away from said fixed element, and power operating means coupled with said movable element and selectively operable for swinging said movable element to grasp a bale between said elements;
   a prime mover coupled with the carriage for raising the same to lift the bale grasped by the bale receiving means of the dolly to an elevation higher than said surface; and
   power means on the carriage and coupled with the dolly for shifting the latter to position the dolly within the framework, thereby disposing the bale above said surface after the bale has been elevated,
   said prime mover having means for lowering the bale onto said surface to form a stack thereon.

2. The invention of claim 1, wherein
   said carriage includes a horizontal track extending toward said framework, said track being movable longitudinally and mounting said dolly for shifting therealong, said power means being coupled with said track for moving the latter toward the framework while shifting the dolly therealong to position the latter within the framework.

3. The invention of claim 2, wherein
   said track is reciprocable toward and away from said framework, said dolly being reciprocable along said track, said power means including sheave and cable means for shifting the dolly along the track in the same direction that the track is moved, simultaneously therewith.

4. The invention of claim 1, wherein is included
   structure for staking a plurality of tiers of elongated bales on said support with each tier having a number of side-by-side bales;
   mechanism for compressing each tier into a unit having a predetermined shape prior to stacking of the next higher tier thereon; and
   means coupled with said mechanism for raising the latter after each tier has been compressed for placing the mechanism in position for compressing said next higher tier.

5. The invention of claim 4, wherein
   said structure has means for depositing the bales onto the support, one at a time, with the longitudinal axes of the bales extending in the same direction at the time of deposit,
   said support being turnable about an upright axis after each tier is compressed into said unit whereby to dispose said longitudinal axes of the bales of each unit at an angle with respect to the longitudinal axes of the bales of each next adjacent unit.

(References on following page)

References Cited

UNITED STATES PATENTS

| | | |
|---|---|---|
| 1,161,680 | 11/1915 | Hulett et al. _____ 212—73 X |
| 2,035,359 | 3/1936 | Anjeskey _____ 214—624 |
| 2,946,465 | 7/1960 | Raynor. |
| 2,977,002 | 3/1961 | Asp. |
| 3,035,716 | 5/1962 | Lamb et al. |
| 3,143,222 | 8/1964 | Caskie. |
| 3,163,302 | 12/1964 | Pridgeon. |
| Re. 25,750 | 3/1965 | Adams et al. |
| 3,251,485 | 5/1966 | Fancher. |
| 3,315,825 | 4/1967 | Scheinert. |
| 3,356,231 | 12/1967 | Chambran. |

FOREIGN PATENTS

| | | |
|---|---|---|
| 890,271 | 11/1943 | France. |

GERALD M. FORLENZA, *Primary Examiner.*

ROBERT J. SPAR, *Assistant Examiner.*

U.S. Cl. X.R.

214—75